(12) United States Patent
Gingrich

(10) Patent No.: US 8,791,361 B2
(45) Date of Patent: Jul. 29, 2014

(54) ARC-RESISTANT SWITCHGEAR ENCLOSURE WITH VENT PROP AND LATCH

(71) Applicant: Paul W. Gingrich, Fulton, MO (US)

(72) Inventor: Paul W. Gingrich, Fulton, MO (US)

(73) Assignee: Central Electric Company, Fulton, MO (US)

( * ) Notice: Subject to any disclaimer, the term of this patent is extended or adjusted under 35 U.S.C. 154(b) by 133 days.

(21) Appl. No.: 13/676,848

(22) Filed: Nov. 14, 2012

(65) Prior Publication Data

US 2014/0133071 A1 May 15, 2014

(51) Int. Cl.
H05K 7/20 (2006.01)
H02B 1/56 (2006.01)

(52) U.S. Cl.
CPC .................................... *H02B 1/565* (2013.01)
USPC ................... 174/17 VA; 361/605; 454/184

(58) Field of Classification Search
CPC ............................................... H05K 7/20136
USPC .................. 174/17 VA; 361/605; 454/184
See application file for complete search history.

(56) References Cited

U.S. PATENT DOCUMENTS

| | | | |
|---|---|---|---|
| 5,193,049 A | 3/1993 | Jackson | |
| 5,574,624 A | 11/1996 | Rennie et al. | |
| 5,689,097 A | 11/1997 | Aufermann et al. | |
| 5,710,402 A | 1/1998 | Karnbach et al. | |
| 5,892,195 A | 4/1999 | Aufermann et al. | |
| 5,905,244 A | 5/1999 | Smith et al. | |
| 6,127,663 A * | 10/2000 | Jones | 219/553 |
| 6,175,486 B1 * | 1/2001 | Ponsioen | 361/605 |
| 6,229,690 B1 * | 5/2001 | Fivelstad et al. | 361/605 |
| 6,407,331 B1 | 6/2002 | Smith et al. | |
| 6,410,844 B1 * | 6/2002 | Bruner et al. | 174/17 VA |
| 6,417,443 B1 * | 7/2002 | Smith | 174/17 VA |
| 7,236,352 B2 | 6/2007 | Dalis | |
| 8,101,881 B2 | 1/2012 | Miller et al. | |
| 8,242,395 B2 * | 8/2012 | Josten et al. | 361/605 |
| 8,492,662 B2 * | 7/2013 | Ballard et al. | 174/522 |
| 2007/0097604 A1 * | 5/2007 | Bruski et al. | 361/605 |

* cited by examiner

*Primary Examiner* — Hung Ngo
(74) *Attorney, Agent, or Firm* — Geoffrey A. Mantooth

(57) ABSTRACT

An arc-resistant switchgear enclosure has interior compartments with outlet vent openings that are selectively closed by vent flaps. The vent flaps are propped in an open position by props that extend from the vent flaps and contact supports. The props have a latch portion that latches the vent flap when the vent flap is in the closed position.

7 Claims, 6 Drawing Sheets

ARC-RESISTANT SWITCHGEAR ENCLOSURE WITH VENT PROP AND LATCH

FIELD OF THE INVENTION

The present invention relates to arc-resistant switchgear enclosures and in particular to vent flap props and latches therefor.

BACKGROUND OF THE INVENTION

Arc-resistant switchgear enclosures house medium voltage electrical switchgear components such as potential transformers (PT), fuses, circuit breakers, etc. A typical enclosure has plural compartments, with each compartment housing one or more electrical components. Medium voltage generally is in the 5-38 KVA range.

During normal operation, the switchgear components generate heat and require air circulation for cooling. The enclosure has vents to provide cooling. For example, an intake or inlet vent may be on or near a front access door. Air is drawn in through the inlet vent, is heated by the switchgear components, rises and exits through a vent in the top of the enclosure, into a plenum.

However, such medium voltage electrical components can experience arc faults. An arc fault creates an explosion of hot gasses which can endanger nearby personnel and equipment.

In order to protect nearby personnel and equipment, enclosures are metal clad and are designed to contain the explosion and vent the explosive gasses in a controlled manner. Personnel and equipment at the front, sides and rear of an enclosure are protected by the walls of the enclosure. The explosive gasses are typically vented up into the plenum which channels the explosive gasses to a safe area, such as a building exterior.

When an arc fault explosion occurs, the intake vent or vents are closed by the force of the explosion. In contrast, the outlet vent is kept open to vent the explosive gasses into the plenum. However, outlet vents for the remaining compartments are closed. This is particularly true for type 2C enclosures, where an arc-fault explosion in one compartment does not enter the remaining compartments, thus preserving the switchgear in those other compartments.

The challenge lies in designing an outlet vent that is normally open to allow for ventilation and cooling of the switchgear components, but suddenly closes during an arc-fault explosion in another compartment and remains closed thereafter.

SUMMARY OF THE INVENTION

An arc-resistant switchgear enclosure comprises exterior walls. An interior compartment is located in the exterior walls. The interior compartment has an outlet vent opening in one of the exterior walls. The outlet vent opening communicates with a plenum. The outlet vent opening has a prop support which has a support bearing surface. A vent flap is located in the plenum and movable between a closed position, where the outlet vent opening is closed, and an open position where the outlet vent opening is open. A prop is attached to the vent flap. The prop has a prop bearing portion that bears partially on the support bearing portion. The prop has an extension portion that extends from the vent flap to the prop bearing portion, the extension being offset from the support bearing portion.

In accordance with one aspect, the prop is made from a sheet of material and has an attachment portion for attaching to the vent flap. The extension portion extends between the attachment portion and the bearing portion.

In accordance with another aspect, the bearing portion is oriented to the extension portion by an acute angle.

In accordance with still another aspect, the prop is "J" shaped.

In accordance with still another aspect, the prop further comprises a latch portion.

In accordance with another aspect, the latch portion forms an acute angle with the bearing portion.

In accordance with still another aspect, the extension portion is generally perpendicular to the vent flap.

DESCRIPTION OF THE PREFERRED EMBODIMENTS

Figure 1:
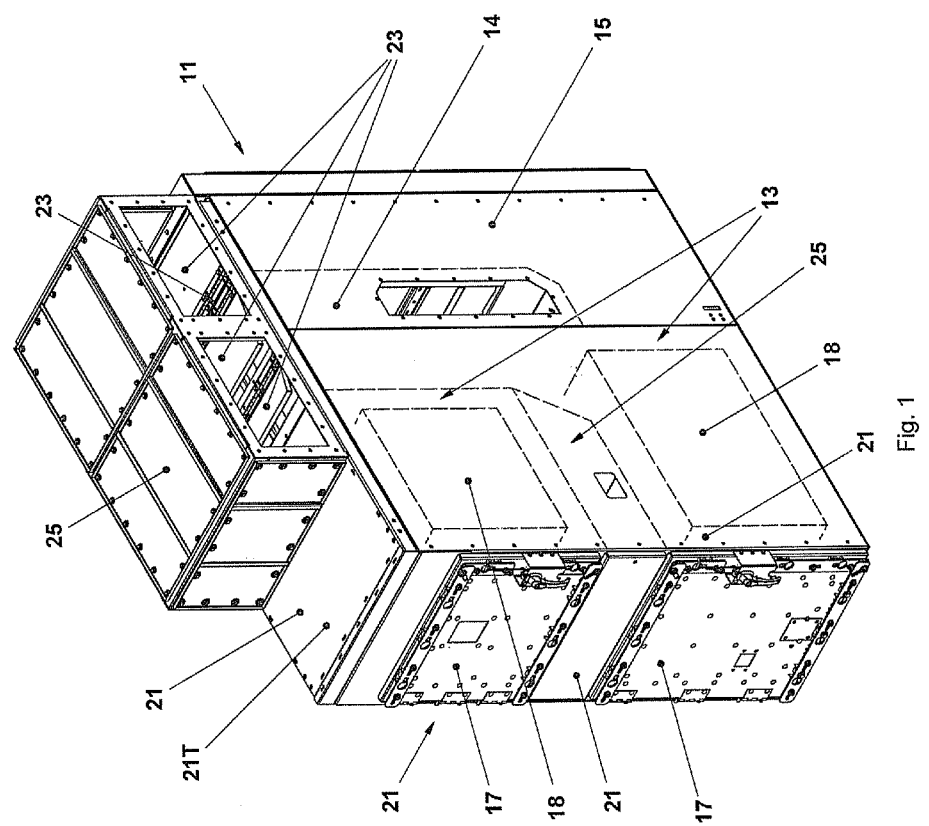
FIG. 1 is a perspective view of an arc-resistant switchgear enclosure.

In FIG. 1, there is shown an arc-resistant switchgear enclosure 11 with plural compartments 13, 14, 15. There are two front compartments 13 (shown generally by dashed lines), with each compartment accessible by a respective door 17. The front compartments 13 may have different dimensions, wherein the front doors 17 will likewise have different dimensions. While the switchgear is in service, the doors 17 are normally closed and latched. If access to a compartment is required, the respective door 17 is opened to reveal a door opening in the enclosure 11. There is also a middle compartment 14 and a rear compartment 15. The compartments 13, 14, 15, are used to house switchgear components 18 (shown in dashed-dot lines) such as potential transformers, fuses, circuit breakers, bus bars, etc. In the description herein, like reference numbers among the figures designate like components.

The enclosure has exterior walls 21 that enclose the compartments 13, 14, 15 and that are capable of containing and directing an arc fault explosion therein. In the preferred embodiment, the walls are metal clad. In the case of a rectangularly shaped enclosure, there is a front wall, side walls, a top wall 21T, a bottom wall and a rear wall. The walls of the enclosure may be referred to herein as a single wall.

The enclosure has vents to allow air to be drawn inside of the compartments for cooling of the switchgear components. Inlet vents 22 (see FIG. 2) are provided to draw air inside. Outlet vents 23 allow the heated air to escape the enclosure.

The inlet vents are typically provided on the front wall or in the front doors. Vent flaps are provided, which flaps close the inlet vents in the event of an arc-fault explosion.

Figure 2:
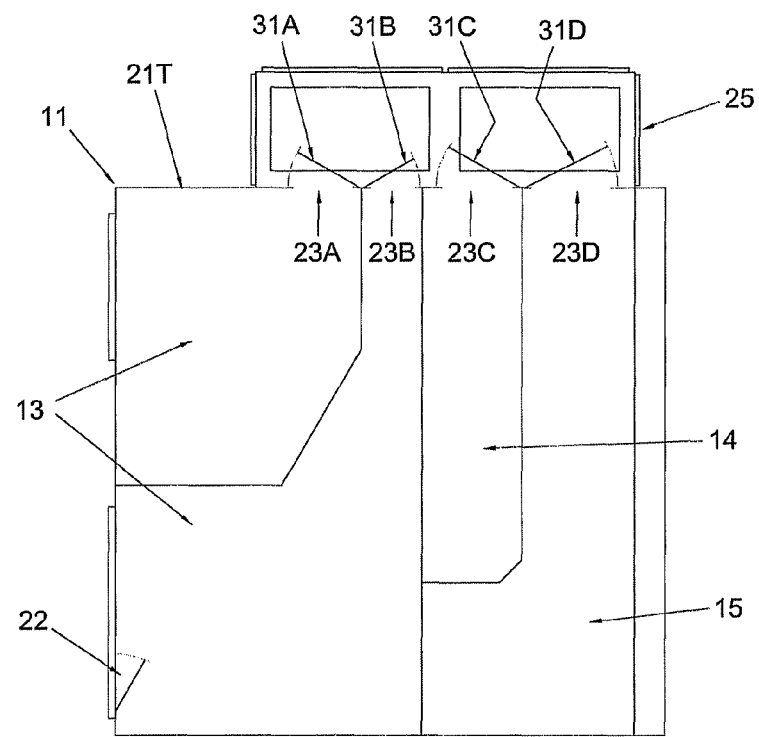
FIG. 2 is a schematic side view of the enclosure showing outlet vents in an open position.
Figure 3:
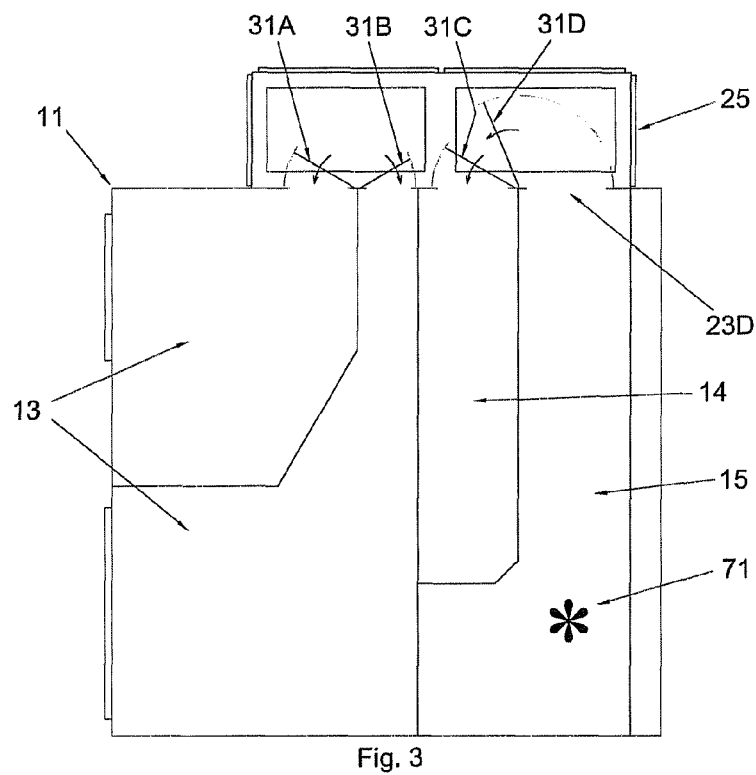
FIG. 3 is a schematic side view of the enclosure where one compartment has experienced an arc-fault explosion.

The top wall 21T contains outlet vents 23, a vent for each compartment. (A control compartment 25 (see FIG. 1) may be provided between the upper and lower front compartments 13. This control compartment, which does not contain medium or high voltage switchgear, is not vented.) Thus, as shown in FIG. 2, there are first and second outlet vents 23A, 23B for the upper and lower compartments 13, a third outlet vent 23C for the middle compartment 14 and a fourth outlet vent 23D for the rear compartment 15. A plenum 25 is located above the enclosure 11 and the outlet vents 23A-23D. As shown in FIG. 3, an arc-fault explosion 71 in a compartment is vented through the respective outlet vent into the plenum 25. The plenum channels the explosion to a safe location, typically outside of the building that houses the enclosure.

Figure 4:
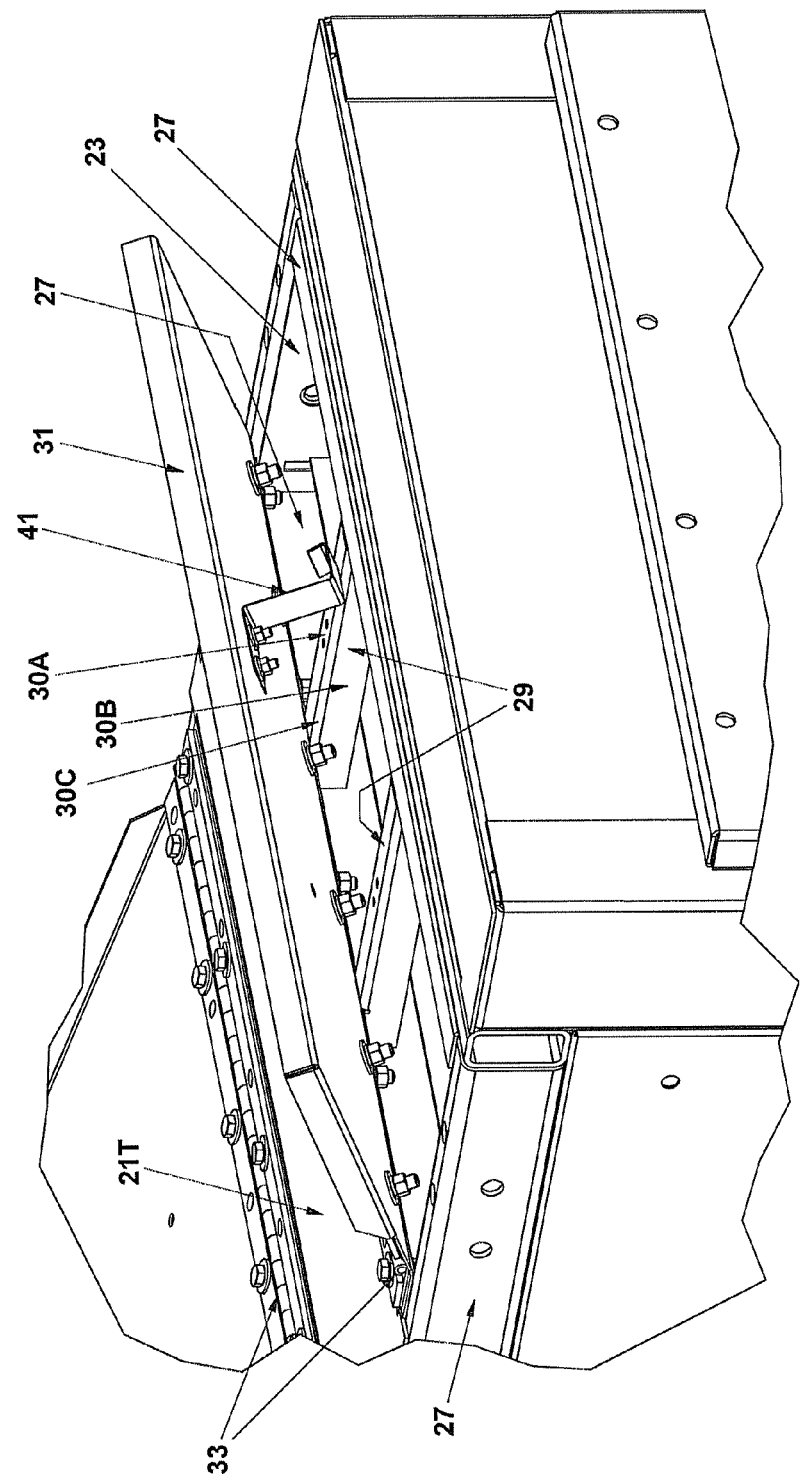
FIG. 4 is a perspective view of an outlet vent flap shown in the open position.
Figure 6:
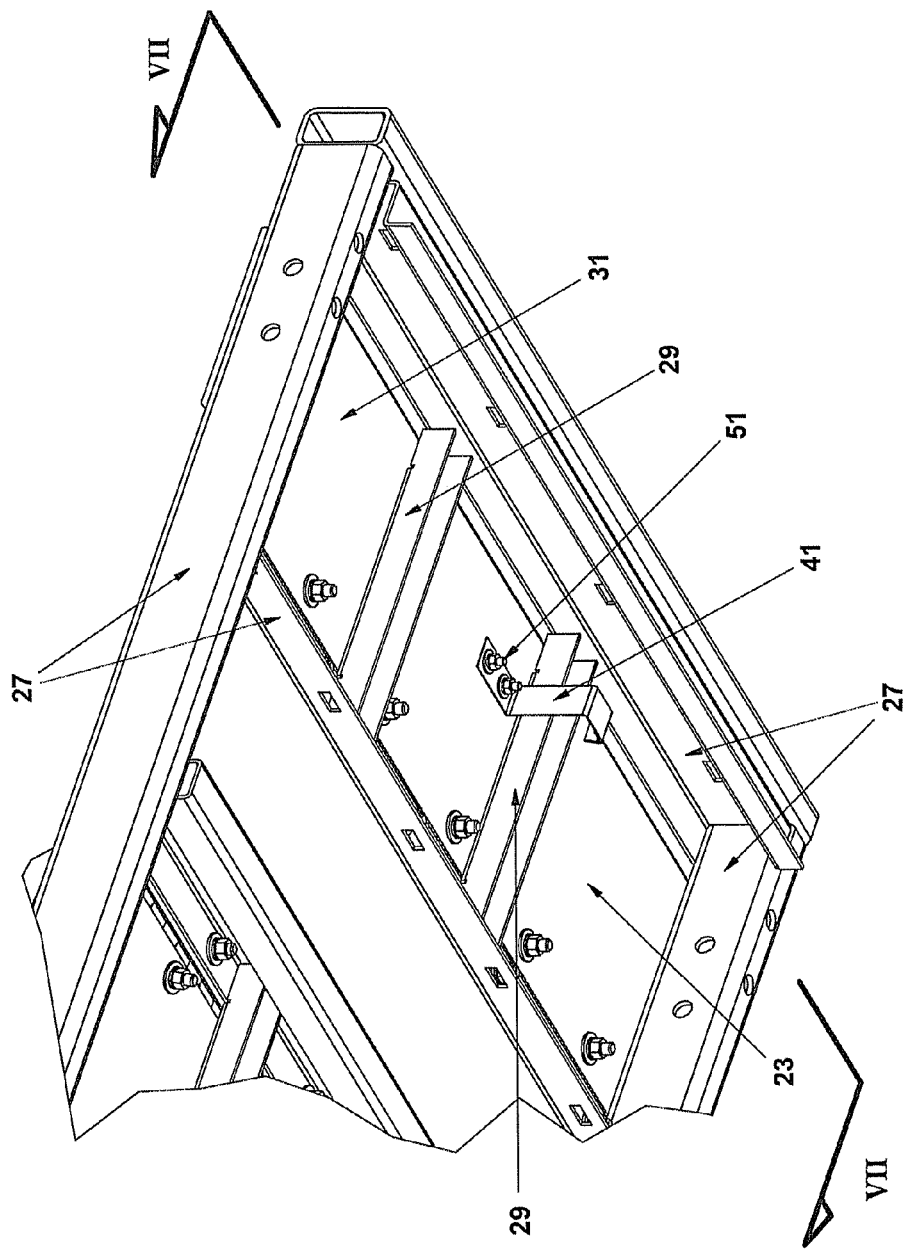
FIG. 6 is a view of the inside of a vent flap of FIG. 4, shown in a closed position.

As shown in FIGS. 4 and 6, each outlet vent opening 23 is formed by supports 27, typically square tubing or channels. The supports 27 are around the perimeter of the vent opening. The outlet vent openings typically extend across the width of the enclosure (that is between the supports 27 along the side walls). The top wall 21T extends between the vent openings and is coupled to the supports 27. In addition to the perimeter supports 27, there may also be provided cross-beam supports 29 that extend across each opening 23.

The supports 27, 29 have a bearing surface 30A and one or more non-bearing surfaces 30B. The bearing surface 30A is typically the top surface, while the non-bearing surfaces are the side surfaces. An edge 30C is formed by the merger of the bearing surface with each of the non-bearing surfaces. The edge 30C may be rounded or square. The bearing surface 30A and edge 30C may be thought of as the support bearing portion.

Figure 7:
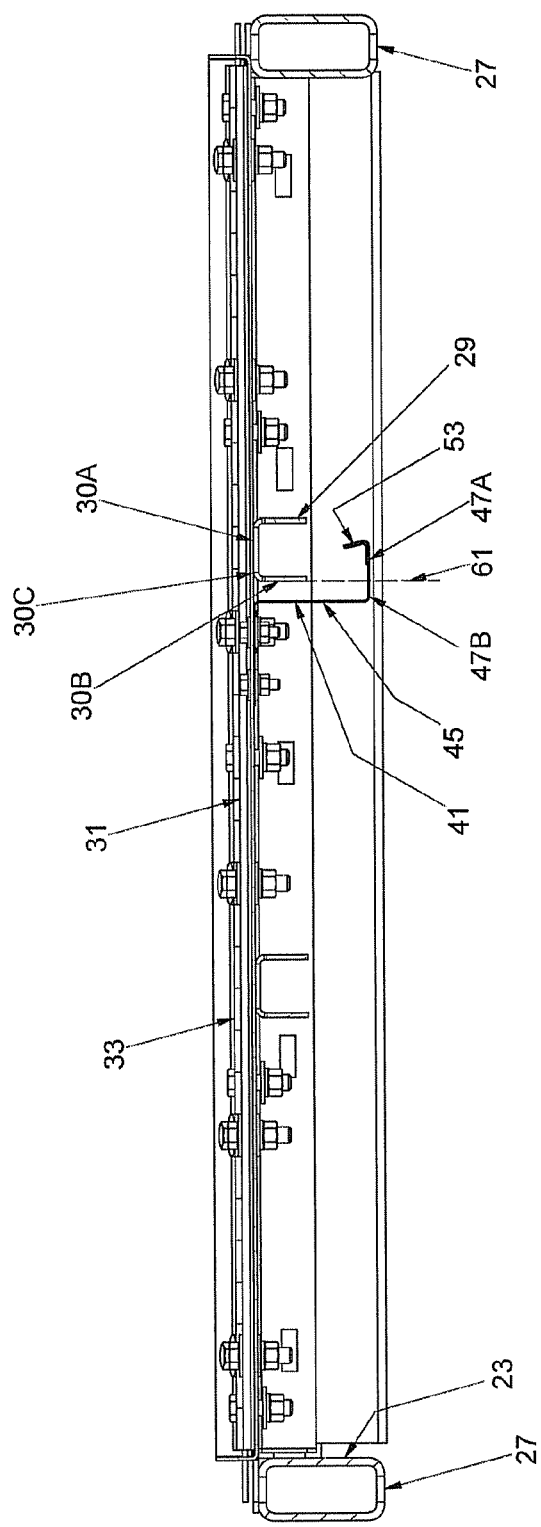
FIG. 7 is a cross-sectional view taken along lines VII-VII of FIG. 6.

Each outlet vent opening 23 has a vent flap 31 associated therewith. Thus, as shown in FIG. 2, there are first through fourth vent flaps 31A-31D. Each vent flap 31 is a metal plate with upturned edges, as shown in FIG. 4. Each vent flap is attached to a perimeter support 27 by way of one or more hinges 33. Each vent flap 31 can move between an open position (FIGS. 2 and 4) and a closed position (FIGS. 3 and 6-7). In the open position, the vent flap is angled with respect to the top wall 21T so as to allow air to exit the respective compartment. In the closed position, the vent flap lays parallel to the top wall and blocks the vent opening.

Figure 5:
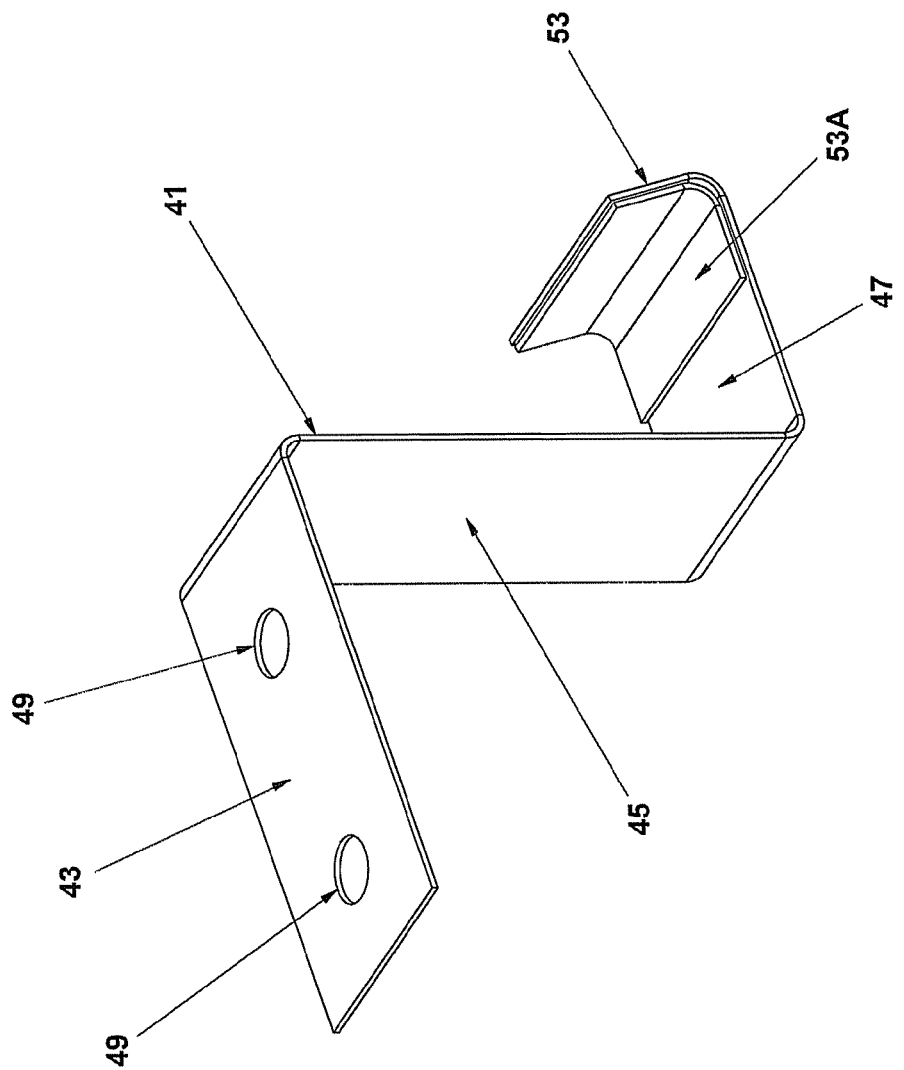
FIG. 5 is a perspective view of a vent prop and latch member.

Referring to FIG. 4, a prop 41 is used in order to maintain each vent flap in a selected open position. As shown in FIG. 5, the prop 41 has an attachment portion 43, an extension portion 45, and a prop bearing portion 47. The attachment portion 41 is coupled to the vent flap 31. In the preferred embodiment, the attachment portion has holes 49 for receiving bolts 51 (see FIG. 6). The attachment portion 43 is bolted to the underside of the vent flap 31. The extension portion 45 extends from the attachment portion 43 for some distance. The prop bearing portion 47 extends from the extension portion 45 and bears on or contacts the enclosure. As shown in FIG. 4, the prop bearing portion 47 contacts a cross-beam support 29.

The prop 41 also has a latch portion 53, which in the preferred embodiment, is an extension of the prop bearing portion 47. The latch portion cooperates with the respective support 29 to latch the vent flap in the closed position. In addition, the latch portion 53 does not interfere with the prop in propping the vent flap in an open position or in allowing the vent flap to close in the event of an arc-fault explosion.

The prop 41 is made of flexible and resilient material such as sheet metal. Another flexible, resilient material is composite such as fiberglass, In the preferred embodiment, the prop is a strip of sheet metal, with an approximate 90 degree bend between the attachment portion 43 and the extension portion 45, and an approximate 90 degree bend between the extension portion 45 and the prop bearing portion 47. The attachment and bearing portions 43, 47 can extend in opposite directions from the extension portion 45, as shown in FIG. 5, or the same direction. The bolts 51 are easier to access with the embodiment shown in FIG. 5.

The latch portion 53 extends from the free end of the prop bearing portion 47. The latch portion 53 forms an acute angle with respect to the bearing portion 47, extending in the general direction of the extension portion 45. The latch portion 53 is reinforced with a second layer of material 53A. This has the effect of stiffening the angle between the latch portion and the prop bearing portion relative to the angle between the prop bearing portion and the extension portion. Thus, the prop bearing portion 47 is more likely to flex with respect to the extension portion 45 than will the latch portion 53 to the prop bearing portion 47. The extension bearing and latch portions 45, 47, 53 make up a "J" shaped part.

The prop 41 is positioned such that part of the bearing portion 47 rests on the support 29, namely the bearing surface 30A. This is illustrated in FIG. 4. Part of the bearing portion 47 does not rest on the support 29. In FIG. 7, a dashed line 61 is drawn from the edge 30C of the relevant support 29 that supports the prop. (FIG. 7 shows the prop no longer resting on the support, but its alignment with the edge 30C of the support is the same.) The bearing portion 47A to the right of the line rests on the support 29 bearing surface 30A (when the vent flap is propped open), while the bearing portion 47B left of the line does not rest on the support. The extension portion 45 is to the left of the dashed line 61. The extension portion 45 is thus offset from the support bearing portion 30A, 30C. This allows a force applied to the vent flap to push down and disengage the prop and the vent flap to close.

In addition, the latch portion 53 of the prop is located so as to engage the support when the vent flap is raised from the closed position, as shown in FIG. 7. The latch portion is underneath the support 29. The support, which is an upside down "U" channel, catches the latch portion 53, thereby restraining the vent flap in the closed position.

In normal operation, the vent flaps 31A-31D are all propped open (see FIG. 2). The bearing portion 47 of the prop rests or bears on a cross-beam support 29 of the particular vent opening (see FIG. 4). The extension portion 45, when bearing the weight of the vent flap, may bow or deflect somewhat. The prop material is resilient and the extension member straightens once the weight is removed from the extension member. As the extension member bows, the prop bearing portion 47 may tilt, and instead of resting squarely on the cross-beam, may rest more forcefully on the edge 30C thereof. The extension portion of the prop is typically several inches in length, so the vent flap is partially open. Heated air from inside the compartment rises and exits through the vent opening into the plenum.

In the event of an arc-fault explosion in a compartment, the vent flaps from the other compartments are closed. For example, FIG. 3 illustrates an arc-fault explosion 71 in the rear compartment 15. The explosion exits through the fourth vent opening 23D and blows the vent flap 31D from its propped open position to a more fully open position. The explosion also acts on the first through third vent flaps 31A-31C, closing those flaps. Thus, the explosion is prevented from entering the other compartments 13, 14 through their respective vent openings, preserving the switchgear components inside. This isolates the damage due to an arc-fault explosion to that single compartment experiencing the explosion.

The first through third vent flaps 31A-31C close as follows. Pressure forces the respective vent flap 31 down. The prop 41 is stressed under this pressure and gives way by flexing so that the bearing portion moves off of, or slides off of, the support 29. The extension member 45 is forced down, which tilts the prop bearing portion on the edge 30C. This in turn forces the latch portion 53 up, off of the support and the angle between the prop bearing portion 47 and the extension portion 45 closes or decreases. The extension portion 45 also flexes away from the support. The angle between the extension portion and prop bearing portion diminishes to the extent that the prop bearing portion is no longer resting on the support. This frees the vent flap to move down to a closed position.

Once the vent flap closes, the prop bearing portion 47 is no longer constrained by the support and is opens, or increases the angle with respect to the extension portion. This positions the latch portion 53 beneath the support (see FIG. 7), thereby latching the vent flap in place.

A flap that is closed quickly by an explosion has a tendency to hit the enclosure wall with such force that it bounces back open. This allows explosive gases to leak past the vent flap. The latch portion 53 prevents this bounce back from occurring.

In a single member, or part, the prop 41 comprises the ability to prop a vent flap in an open position and to latch it closed when shut. The prop is inexpensive and simple to use.

Once an explosion occurs, the enclosure 11 is damaged and is replaced. The switchgear components 18 in the other compartments are salvaged from the enclosure for reuse in another, undamaged, enclosure. The enclosure is a type 2C enclosure.

The reinforcing 53A of the latch portion need not be provided. The reinforcing ensures that the latch will hold whenever the vent flap is closed and tries to bounce open.

Although the prop has been described as bearing on a cross-beam support, the prop could also bear on a perimeter support 23. The orientation of the prop is such that the extension portion is aligned inside of the support and the bearing portion extends across an inner edge of the support.

The prop 41 can be provided without the attachment portion 43 and coupled to the vent flap by other means. For example, the prop extension portion can be welded to the vent flap. Alternatively, the vent flap can have a flange for attaching the prop.

The foregoing disclosure and showings made in the drawings are merely illustrative of the principles of this invention and are not to be interpreted in a limiting sense.

The invention claimed is:

1. An arc-resistant switchgear enclosure, comprising:
 a) exterior walls;
 b) an interior compartment located in the exterior walls, the interior compartment having an outlet vent opening in one of the exterior walls;
 c) the outlet vent opening communicating with a plenum, the outlet vent opening having a prop support, the prop support having a support bearing portion;
 d) a vent flap located in the plenum and movable between a closed position, where the outlet vent opening is closed, and an open position where the outlet vent opening is open;
 e) a prop attached to the vent flap, the prop having a prop bearing portion that bears partially on the support bearing portion, the prop having an extension portion that extends from the vent flap to the prop bearing portion, the extension being offset from the support bearing portion.

2. The arc-resistant switchgear enclosure of claim 1 wherein the prop is made from a sheet of material and has an attachment portion for attaching to the vent flap, the extension portion extending between the attachment portion and the bearing portion.

3. The arc-resistant switchgear enclosure of claim 2 wherein the bearing portion is oriented to the extension portion by an acute angle.

4. The arc-resistant switchgear enclosure of claim 1 wherein the prop is "J" shaped.

5. The arc-resistant switchgear enclosure of claim 1 wherein the prop further comprises a latch portion.

6. The arc-resistant switchgear enclosure of claim 5 wherein the latch portion forms an acute angle with the bearing portion.

7. The arc-resistant switchgear enclosure of claim 1 wherein the extension portion is generally perpendicular to the vent flap.

* * * * *